US012671698B2

(12) United States Patent
McGrew et al.

(10) Patent No.: US 12,671,698 B2
(45) Date of Patent: Jun. 30, 2026

(54) DETECTING AND ALERTING ON DOMAIN FRONTING WITHIN A NETWORK

(71) Applicant: Cisco Technology, Inc., San Jose, CA (US)

(72) Inventors: David Arthur McGrew, Poolesville, MD (US); Blake Harrell Anderson, Chapel Hill, NC (US)

(73) Assignee: Cisco Technology, Inc., San Jose, CA (US)

( * ) Notice: Subject to any disclaimer, the term of this patent is extended or adjusted under 35 U.S.C. 154(b) by 507 days.

(21) Appl. No.: 18/152,649

(22) Filed: Jan. 10, 2023

(65) Prior Publication Data
US 2024/0236118 A1 Jul. 11, 2024

(51) Int. Cl.
*H04L 9/40* (2022.01)

(52) U.S. Cl.
CPC ...... *H04L 63/1416* (2013.01); *H04L 63/0236* (2013.01); *H04L 63/1425* (2013.01)

(58) Field of Classification Search
None
See application file for complete search history.

(56) References Cited

U.S. PATENT DOCUMENTS

| | | | | |
|---|---|---|---|---|
| 11,201,881 | B2 * | 12/2021 | Janakiraman | ......... H04L 67/306 |
| 2010/0057895 | A1 * | 3/2010 | Huang | ................ H04L 63/0272 |
| | | | | 709/222 |

| | | | | |
|---|---|---|---|---|
| 2013/0179467 | A1 | 7/2013 | Ain | |
| 2015/0100664 | A1 | 4/2015 | Flack et al. | |
| 2019/0095512 | A1 | 3/2019 | Mahjoub et al. | |
| 2020/0358792 | A1 * | 11/2020 | Bazalgette | ............. G06N 20/00 |
| 2022/0224716 | A1 * | 7/2022 | Salji | .................... H04L 63/1416 |

FOREIGN PATENT DOCUMENTS

| | | | | |
|---|---|---|---|---|
| CN | 109474568 A | | 3/2019 | |
| WO | WO2005096160 A1 * | | 10/2005 | ............. G06F 13/00 |

OTHER PUBLICATIONS

The PCT Search Report and Written Opinion mailed Apr. 17, 2024 for PCT application No. PCT/US2024/010886, 26 pages.
Sun et al., "Detecting Malware Injection with Program-DNS Behavior", 2020 IEEE European Symposium on Security and Privacy (EuroS&P), Sep. 2020, pp. 552-568.

* cited by examiner

*Primary Examiner* — Paul R Fisher
(74) *Attorney, Agent, or Firm* — Lee & Hayes, P.C.

(57) ABSTRACT

This disclosure describes techniques and mechanisms for detecting and alerting on domain fronting within a network using network location context. Popular services are often hosted by multiple CDNs to increase resiliency and decrease latency. The techniques described herein utilize this insight to identify anomalous encrypted sessions by first creating a baseline of domain name resolutions for a given customer site. The techniques may then look for encrypted sessions destined to an IP address that is anomalous for the given domain name and is known to support domain fronting.

20 Claims, 7 Drawing Sheets

COLLECT NETWORK DATA
402

IDENTIFY DATA ASSOCIATED WITH HOSTING PROVIDER(S)
404

SEND SCAN(S) TO HOSTING PROVIDER(S)
406

RECEIVE RESULT DATA ASSOCIATED WITH THE SCAN(S)
408

GENERATE AN ENHANCED THREAT INTELLIGENCE FEED
410

500

COLLECT DATA ASSOCIATED WITH A NETWORK SITE
502

GENERATE A BASELINE ASSOCIATED WITH THE NETWORK SITE
504

RECEIVE NETWORK DATA ASSOCIATED WITH NETWORK TRAFFIC
506

IDENTIFY CONNECTION(S) ASSOCIATED WITH SUSPICIOUS ACTIVITY
508

GENERATE AN ALERT
510

DETECTING AND ALERTING ON DOMAIN FRONTING WITHIN A NETWORK

TECHNICAL FIELD

The present disclosure relates generally to the field of computer networking, and more particularly to detecting and alerting on domain fronting within a network using network location context.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Threat and compliance data provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

Malicious actors can use domain fronting to hide their network sessions from enterprise detection and response systems. Detecting sessions that use domain fronting is a hard problem. For instance, malicious actors have many options when choosing a front domain, both in the domain and the hosting provider associated with the domain.

In general, domain fronting relies on content delivery networks (CDNs). However, traditional DNS security methods fail to detect domain fronting. One way to detect domain fronting is to decrypt every encrypted HTTPs session. However, this is resource intensive and not practical in large networks.

In some examples, network security blocking and alerting may be performed on lists of domain names and IP addresses provided by threat intelligence feeds. These feeds contain addresses and names that are believed to be associated with threats, and it is considered an Indicator of Compromise (IoC) when a device communicates with one of them. However, this approach fails when a name or address on the IoC list is associated with infrastructure that supports domain fronting, since domain names and IP addresses associated with domain fronting can lead to increased false positives (where a benign fronted domain erroneously ends up on the block/alert list) and increased false negative by attempting to block IoCs that are easily changed.

Accordingly, there is a need for a simplified way to detect server(s) that support domain fronting and generate enhanced threat intelligence feeds to improve blocking and alerting and improve network security. Moreover, there is a need to be able to identify when an attacker is selecting an anomalous hosting provider that supports domain fronting, raise an alert, and avoid alerting on every session hosted on the anomalous provider.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1B illustrates a system-architecture diagram of an environment in which a system can detect domain fronting within a network.

DESCRIPTION OF EXAMPLE EMBODIMENTS

Overview

Figure 1A:
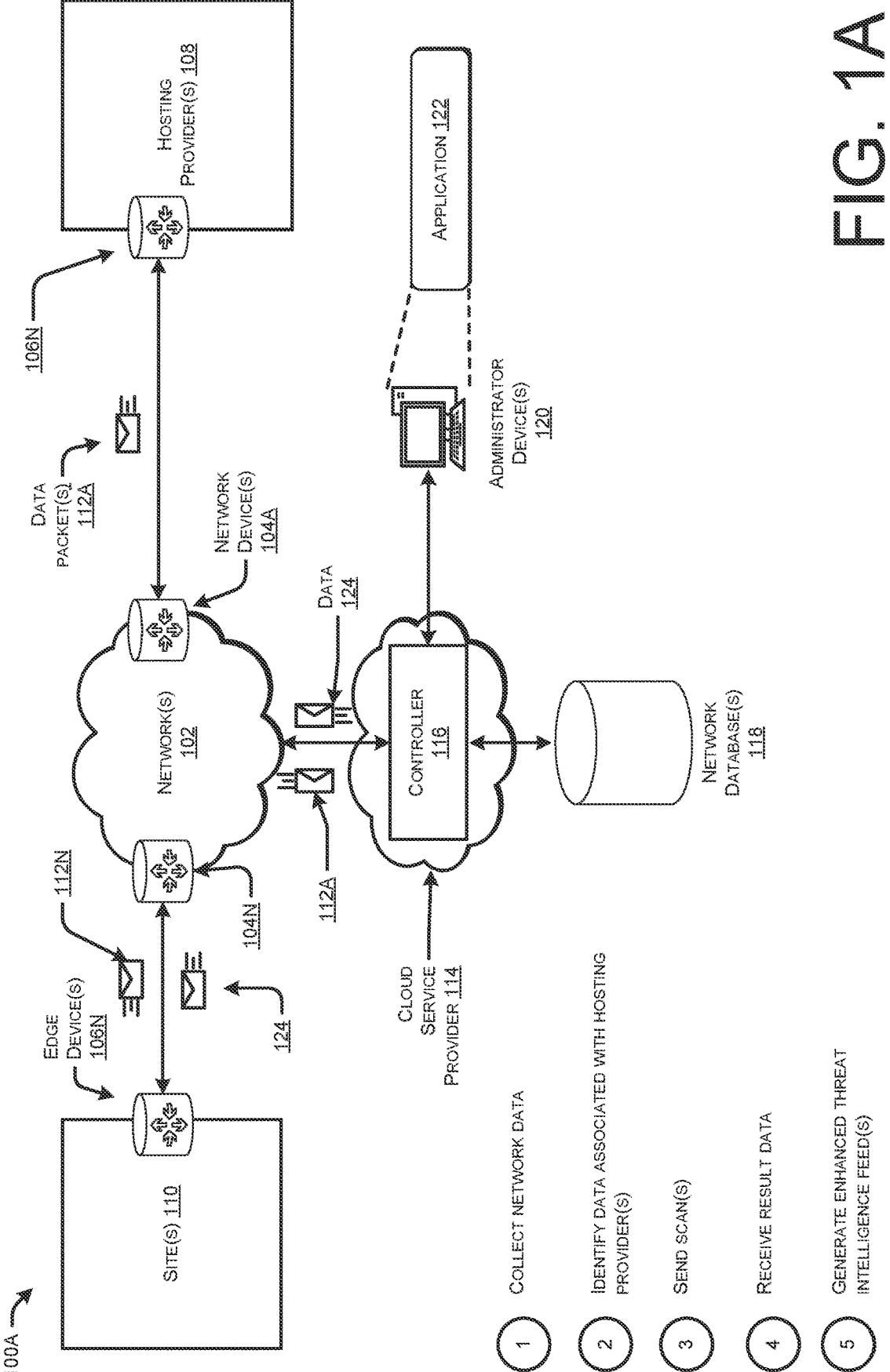
FIG. 1A illustrates a system-architecture diagram of an environment in which a system can detect domain fronting using intelligence within a network.

The present disclosure relates generally to the field of computer networking, and more particularly to detecting and alerting on domain fronting within a network using network location context.

A method to perform the techniques described herein may include collecting, from a plurality of devices within the network, network data. The method may include identifying, based at least in part on the network data, data associated with one or more hosting providers. Further, the method may include sending, to the one or more hosting providers, one or more scans. The method may also include receiving, from the one or more hosting providers, result data associated with the one or more scans. Additionally, the method may include generating, based at least in part on the result data, an enhanced threat intelligence feed.

An additional method to perform the techniques described herein may include collecting, from a plurality of devices within a network, data associated with a network site. The method may include generating, based at least in part on the data, a baseline associated with the network site. Additionally, the method may include receiving, from the plurality of devices, network data associated with network traffic. Further the method may include identifying, based at least in part on the baseline and the network traffic, one or more connections associated with suspicious activity. The method may include generating, based at least in part on the identifying, an alert.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

Example Embodiments

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

Malicious actors can use domain fronting to hide their network sessions from enterprise detection and response systems. Detecting sessions that use domain fronting is a hard problem. For instance, malicious actors have many options when choosing a front domain, both in the domain and the hosting provider associated with the domain.

In general, domain fronting relies on content delivery networks (CDNs). However, traditional DNS security methods fail to detect domain fronting. One way to detect domain fronting is to decrypt every encrypted HTTPs connection. However, this is resource intensive and not practical in large networks.

In some examples, network security blocking and alerting may be performed on lists of domain names and IP addresses provided by threat intelligence feeds. These feeds contain addresses and names that are believed to be associated with threats, and it is considered an Indicator of Compromise (IoC) when a device communicates with one of them. However, this approach fails when a name or address on the IoC list is associated with infrastructure that supports domain fronting, since domain names and IP addresses associated with domain fronting can lead to increased false positives (where a benign fronted domain erroneously ends up on the block/alert list) and increased false negative by attempting to block IoCs that are easily changed.

Accordingly, there is a need for a simplified way to detect server(s) that support domain fronting and generate enhanced threat intelligence feeds to improve blocking and alerting and improve network security. Moreover, there is a need to be able to identify when an attacker is selecting an anomalous hosting provider that supports domain fronting, raise an alert, and avoid alerting on every session hosted on the anomalous provider.

This disclosure describes techniques and mechanisms for improving blocking and alerting within a network using domain fronting intelligence. In some examples, the techniques may be for detecting domain fronting within a network. In some examples, the system may collect, from a plurality of devices within the network, network data. In some examples, the system may identify, based at least in part on the network data, data associated with one or more hosting providers. In some examples, the system may send, to the one or more hosting providers, one or more scans. In some examples, the system may receive, from the one or more hosting providers, result data associated with the one or more scans. In some examples, the system may generate, based at least in part on the result data, an enhanced threat intelligence feed.

Moreover, this disclosure describes techniques and mechanisms for detecting and alerting on domain fronting within a network using network location context. In some examples, the system may collect, from a plurality of devices within a network, data associated with a network site. In some examples, the system may generate, based at least in part on the network data, a baseline associated with the network site. The system may receive, from the plurality of devices, network data associated with network traffic. In some examples, the system may identify, based at least in part on the baseline and the network traffic, one or more connections associated with suspicious activity. In some examples, the system may generate, based at least in part on the identifying, an alert.

In some examples, the system may comprise a collection module. In some examples, the collection module may collect data and/or network data associated with the network. In some examples, the data and/or network data may comprise a plurality of DNS CNAME records. In some examples, the DNS CNAME records may comprise one or more of a requested domain, a canonical name, an IP address, and/or any other data included in a DNS CNAME record. In some examples, the collection module may store the data and/or network data in local memory and/or a database associated with the system.

In some examples, the collection module may collect and/or store collects all DNS responses associated with a particular site within the network. In some examples, the collection module may collect the IP addresses of the DNS servers used in the enterprise. For TLS and HTTP connections, the collection module may collect the destination IP addresses and estimate the RTT. The information is taken directly from the TLS/HTTP session, which helps to lessen the impact of unsanctioned encrypted DNS and preserve network resources.

In some examples, the system may comprise a passive analysis module. In some examples, the passive analysis module is configured to mine the data and/or network data collected and stored by the collection module. For instance, the passive analysis module may extract one or more of the requested domain, the canonical name, and the IP addresses from DNS CNAME records collected from large scale real-world observations. In some examples, the passive analysis module may map one or more pairs of domain name(s), IP address(es), and/or CDN hostname(es) to one or more canonical names. For instance, the dataset may map the alias domains to the canonical domains and may be further filtered by looking for canonical names (e.g., such as "e.sni.global.fastly.net", "ghs.googlehosted.com," etc.) that host a large and diverse set of domain names.

In this way, the system may generate a list of pairs of <domain name, IP address> that map to the same canonical name. That is, the system may intelligently identify a set of names (e.g., encrypted names) to try and/or use for active scanning and/or to determine if domain fronting is occurring.

In some examples, the passive analysis module may define other ways to group <domain name, IP address> pairs to seed the active scan(s) for domain fronting. For instance, the passive analysis module may identify all observed pairs that belong to the same autonomous system, all observed pairs that map to the same IP address, and/or all observed pairs that map to subnets published by cloud service providers.

In some examples, the passive analysis module may utilize a domain name associated with a particular site within the network and may build a histogram of the IP addresses (and associated autonomous systems) and relevant DNS fields (e.g., canonical name and/or the authoritative DNS server). In some examples, such as for TLS and HTTP connections, the passive analysis module may incorporate the destination IP addresses and estimates the RTT into the histogram(s). In some examples, the destination IP address (es) and/or RTTs may be extracted directly from the TLS certificate(es) and/or HTTP header(s) to help lessen the impact of unsanctioned encrypted DNS and preserve network resources.

In some examples, the system may comprise an active scanning module. In some examples, the active scanning module may, for the pairs of <domain name, IP address> that map to the same canonical name (e.g., identified by the passive analysis module), initiate a series of targeted scans to determine whether the hosting provider supports domain fronting. For instance, the active scanning module may send one or more scans to the hosting provider. In some examples, there are two, primary scans that are baseline scans where the TLS client_hello and HTTP request contain the target domain and a fronting scan where the TLS client_hello contains the fronted domain and the HTTP request contains the target domain.

In some examples, the system may comprise a feeds module. In some examples, the feeds module may generate a comprehensive list of domains that map to hosting providers that support domain fronting. For instance, the feeds module may collect and/or store the resulting TLS certificate and HTTP response data from the scan(s). In some examples, the feeds module may compare the result data (e.g., the TLS certificate and HTTP response data) from the scan(s) to determine if a hosting provider supports domain fronting. In some examples, the list(s) comprise threat intelligence feed(s), which may be used by the system to augment threat intelligence data to include additional information related to domain fronting such as indicating support for domain fronting, the canonical name used by the hosting provider, and a set of popular domains that could be used to front, etc.

Further, the list(s) may comprise set(s) of canonical names, IP subnets, and autonomous systems associated with domain fronting, which may be distributed to add additional context to alerts that may have initially seemed benign to a human analyst.

In some examples, the system may comprise an action module. In some examples, the action module may receive the intelligence threat feed(s) generated by the feed(s) module. In this example, the action module may generate network events that are annotated if the destination IP address maps to infrastructure that supports domain fronting. Further, the actions module may generate a weak indicator if the network event could be used as a front for a domain on the block list. For instance, the alert may be intelligent such that an administrator and/or end user does not just receive list of domain names and/or canonical names. Instead, the alert may identify and alert the administrator and/or end user of a specific canonical name and/or domain name being used. In some examples, the action module may enable aggressive blocking. In some examples, a network administrator may configure the action module to enable aggressive blocking. In some examples, aggressive blocking may indicate domain names and/or percentage(s) associated with domains of a hosting provider that support domain fronting. In some examples, aggressive blocking may comprise identifying relatively low prevalence domain names and a prevalence of associated domain fronting. In some examples, a network administrator can configure firewall to block specific canonical name identified. In some examples, aggressive blocking can be based on a threshold, where an alert to network administrator can be based on the threshold being met or exceeded. In some examples, the action module may create a watchlist of domain names and/or IP addresses that can be used for alerting and/or blocking. For instance, the action module may utilize the watchlist and/or apply it to an existing watchlist to check for domain fronting. In some examples, the actions module may be configured to instruct a DNS service to optimize responses to not include infrastructure that supports domain fronting. For example, the instructions may indicate to map returning Akamai-based IP addresses for "ctldl.windowsupdate.com" as opposed to mapping IP addresses mapping to StackPath and/or Limelight.

In some examples, the actions module may be configured to determine connection to a popular domain is seen going to a destination IP address with a low prevalence with respect to other connections from the same site. In this example, the actions module may send a series of DNS scans to DNS servers that the endpoint and similar endpoints have previously used. In this example, the DNS response data may then be analyzed to check whether the destination IP address would have been selected organically or if the endpoint application would have specifically selected the destination provider and/or hosting provider. For instance, a destination IP address and/or CDN server (e.g., such as Azure, Stackpath, etc.) may be selected organically based on location of an endpoint application and/or a location of the CDN server, such that round trip time (RTT) is minimized and/or time to live (TTL) is greatest. In this example, if an application selects a hosting provider that does not minimize RTT, maximize TTLs, and/or does support evasive behaviors (e.g., such as domain fronting), then the action module may generate an alert that can be correlated with other endpoint and/or network events. In some examples, the alert is sent to the controller in the cloud service provider. In some examples, the alert is sent to an application of a service provider (e.g., such as SecureX of Cisco) and may be correlated with other event(s). In some examples, the IP addresses of popular domains that are inappropriate for a network location can be used to identify anomalous connections using a fast IP prefix lookup scheme. In some examples, the action module may block a connection to a CDN server. For instance, where one or more first connection(s) from one or more computing device(s) at a site in the network are going to a first CDN server (e.g., such as Azure) that does not support domain fronting and one or more second connection(s) from one or more second computing device(s) located at the same network site are going to a second CDN server (e.g., such as StackPath) that does support domain fronting, the action module may (i) generate an alert and/or (ii) block the connection(s) to StackPath in order to cause the second computing device(s) to reissue a DNS query.

In this way, the system is able to utilize the enhanced intelligence threat feeds to perform more aggressive blocking, raising weak alerts that correlate with other system alerts. Further, by de-prioritizing infrastructure that supports domain fronting for DNS responses, the described system may create a more secure DNS system. Moreover, by utilizing RTT and TTLs, the system may identify domain fronting from the same site within a network, improving the security of the network and reducing network latency.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates a system-architecture diagram of an environment in which a system 100A can detect domain fronting using intelligence within a network. While the system 100A shows an example controller 116, it is understood that any of the components of the system 100A and/or 100B described below may be implemented on any device in the network 102.

In some examples, the system 100 may include a network 102 that includes network devices 104. The network 102 may include one or more networks implemented by any viable communication technology, such as wired and/or wireless modalities and/or technologies. The network 102 may include any combination of Personal Area Networks (PANs), software defined cloud interconnects (SDCI), Local Area Networks (LANs), Campus Area Networks (CANs), Metropolitan Area Networks (MANs), extranets, intranets, the Internet, short-range wireless communication networks (e.g., ZigBee, Bluetooth, etc.), Content Delivery Networks (CDNs), Wide Area Networks (WANs)—both centralized and/or distributed, software defined WANs (SDWANs)—and/or any combination, permutation, and/or aggregation thereof. The network 102 may include devices, virtual resources, or other nodes that relay packets from one network segment to another by nodes in the computer network. The network 102 may include multiple devices that utilize the network layer (and/or session layer, transport layer, etc.) in the OSI model for packet forwarding, and/or other layers.

The system 100 may comprise a controller 116. In some examples, the controller 116 corresponds to a system that has complete visibility into the security fabric of a given network (e.g., enterprise network, smaller network, etc.). In some examples, the controller 116 may comprise a memory, one or more processors, etc. In some examples, the controller 116 may be integrated as part of a cloud service provider 114 (e.g., such as AWS). In some examples, the controller 116 may be integrated as part of one or more server(s) of the network 102.

The controller 116 may be configured to communicate with one or more network device(s) 104. For instance, the controller 116 may receive network data (e.g., network traffic load data, network client data, etc.) or other data (e.g., application load data, data associated with WLCs, APs, etc.) from the network device(s) 104. The network device(s) 104 may comprise routers, switches, access points, stations, radios, and/or any other network device. In some examples, the network device(s) 104 may monitor traffic flow(s) within the network and may report information associated with the traffic flow(s) to the controller 116.

In some examples, the system comprises hosting provider(s) 108 and/or site(s) 110. In some examples, the hosting provider(s) 108 comprise may comprise one or more CDN server(s) (e.g., such as Azure, StackPath, etc.), DNS service provider(s), and/or any cloud provider (e.g., SaaS, Internet, IaaS, etc.). In some examples, the hosting provider(s) are located at one or more locations.

In some examples, the site(s) 110 may comprise one or more network device(s) 104, gateway device(s) (also referred to herein as "gateways"), tunneling interfaces, endpoint device(s) (e.g., computing device(s)), application(s), etc. In some examples, the site(s) 110 may comprise one or more user(s), mobile device(s), and/or Internet of Things (IoT) device(s) located at one or more locations.

In some examples, the hosting provider(s) 108 communicate via edge device(s) 106. In some examples, the edge device(s) 106 comprise one or more routers, access point(s), and/or any other network device. In some examples, the edge device(s) 106 may comprise an ingress and/or egress router. In some examples, the hosting provider(s) 108 and/or site(s) 110 communicate with each other, the controller 116, and/or cloud providers (e.g., SaaS, Internet, IaaS, etc.) via the network(s) 102.

In some examples, the edge device(s) 106 and/or network device(s) 104 may communicate information. For instance, the network device(s) 104 may send data packet(s) 112 associated with data flows to other network device(s) and/or edge device(s) 106. In some examples, the data packet(s) 112 and/or metadata associated with the data packet(s) 112 may be sent to and/or monitored by the controller 116.

In some examples, the controller 116 may be configured to monitor the packets 112. In some examples, the packets may comprise data (e.g., which application is used, by which station, traffic characteristics and duration, etc.) associated with network traffic and may store the data as part of the system and/or controller 116 (e.g., such as in a network database 118 and/or memory associated with the controller 116).

In some examples, the controller 116 may send data 124 to the site(s) 110 and/or hosting provider(s) 108. In some examples, the data 124 may comprise instruction(s) associated with an alert and/or blocking. In some examples, the data 124 may comprise one or more scan(s), as described above.

In some examples, the controller 116 may be configured to communicate with administrator device(s) 120. As illustrated, the administrator device(s) 120 may comprise an application 122. In some examples, the application 122 may correspond to an application provided by a service provider (e.g., such as Cisco) that enables an administrator of the network 102 to access the controller 116. For instance, the application 122 may correspond to a service application provided to Cisco end user(s) and/or network administrators. In some examples, the application 122 may be integrated as part of the cloud service provider 114.

At "1", the system may collect network data. For instance, the system may collect network data via the collection module described above.

At "2", the system may identify data associated with hosting provider(s). For instance, the system may identify the data using the passive analysis module described above. In some examples, the data may comprise domain name(s), IP address(es), CDN hostnames, etc. As described above, the system may extract one or more of the requested domain, the canonical name, and the IP addresses from DNS CNAME records collected from large scale real-world observations. In some examples, the system may map one or more pairs of domain name(s), IP address(es), and/or CDN hostname(es) to one or more canonical names. For instance, the dataset may map the alias domains to the canonical domains and may be further filtered by looking for canonical names (e.g., such as "e.sni.global.fastly.net", "ghs.google-hosted.com," etc.) that host a large and diverse set of domain names.

In some examples, the passive analysis module may define other ways to group <domain name, IP address> pairs to seed the active scan(s) for domain fronting. For instance, the passive analysis module may identify all observed pairs that belong to the same autonomous system, all observed pairs that map to the same IP address, and/or all observed pairs that map to subnets published by cloud service providers.

At "3", the system may send scan(s). For instance, the system may send scan(s) using the active scanning module described above. For example, for the pairs of <domain name, IP address> that map to the same canonical name, the system may initiate a series of targeted scans to determine whether the hosting provider supports domain fronting. For instance, the system may send one or more scans to the hosting provider. In some examples, there are two, primary scans that are baseline scans where the TLS client_hello and HTTP request contain the target domain and a fronting scan where the TLS client_hello contains the fronted domain and the HTTP request contains the target domain.

At "4", the system may receive result data. In some examples, the result data may comprise the TLS certificate and HTTP response data associated with the scan(s).

At "5", the system may generate enhanced threat intelligence feeds. For instance, the system may generate a comprehensive list of domains that map to hosting providers that support domain fronting. For instance, the feeds module may collect and/or store the resulting TLS certificate and HTTP response data from the scan(s). In some examples, the feeds module may compare the result data) from the scan(s) to determine if a hosting provider supports domain fronting. In some examples, the list(s) comprise threat intelligence feed(s), which may be used by the system to generate an enhanced (e.g., augmented) threat intelligence feed. The enhanced threat intelligence feed may comprise augmented threat intelligence data that includes additional information related to domain fronting such as indicating support for domain fronting, the canonical name used by the hosting provider, and a set of popular domains that could be used to front, etc.

Further, the list(s) may comprise set(s) of canonical names, IP subnets, and autonomous systems associated with domain fronting, which may be distributed to add additional context to alerts that may have initially seemed benign to a human analyst.

In this way, the system may generate a list of pairs of <domain name, IP address> that map to the same canonical name. That is, the system may intelligently identify a set of names (e.g., encrypted names) to try and/or use for active scanning and/or to determine if domain fronting is occurring. Moreover, the system is able to utilize the enhanced intelligence threat feeds to perform more aggressive blocking, raising weak alerts that correlate with other system alerts. Further, by de-prioritizing infrastructure that supports domain fronting for DNS responses, the described system may create a more secure DNS system.

Figure 1B:
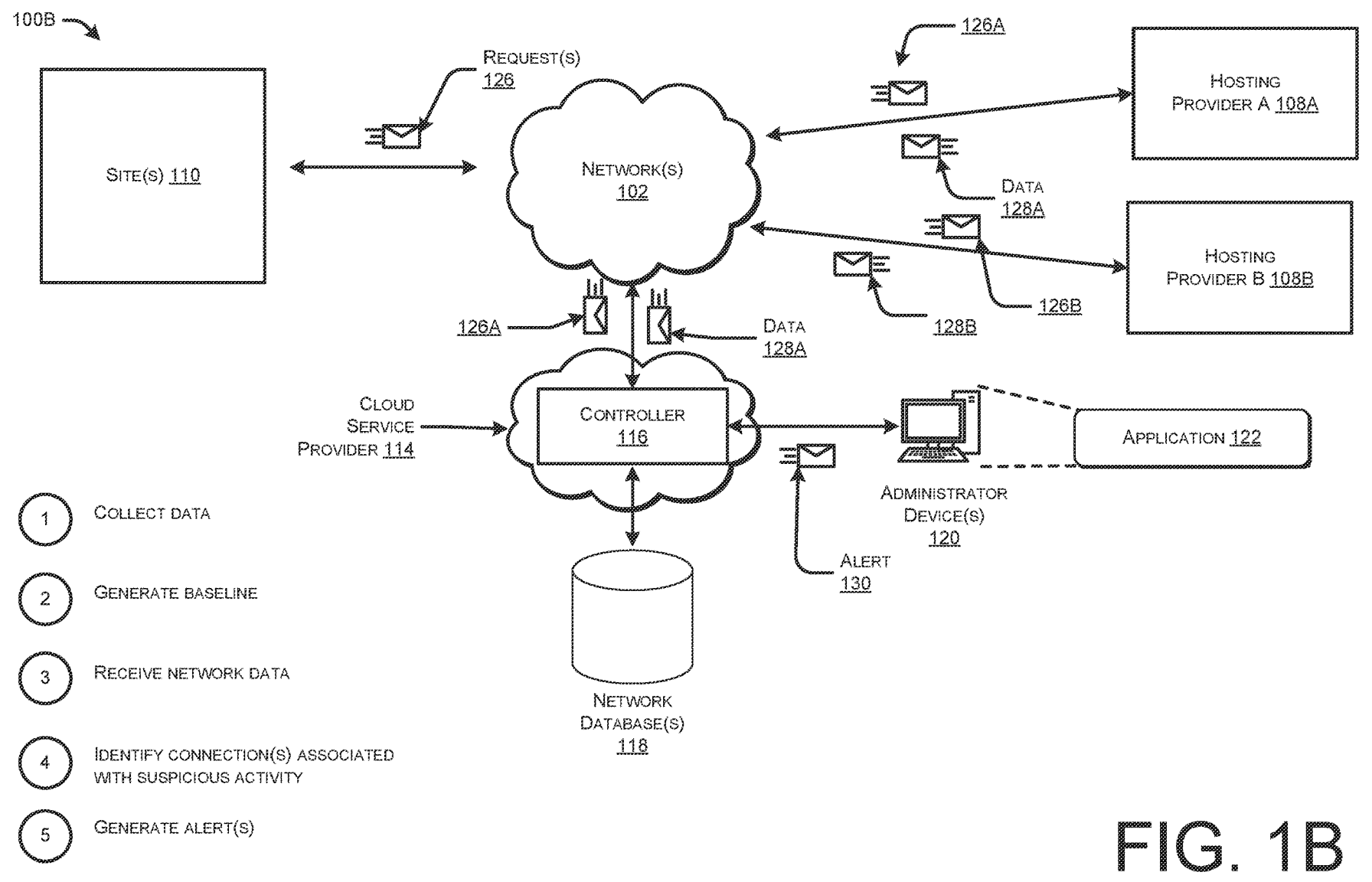

FIG. 1B illustrates a system-architecture diagram of an environment in which a system 100B can detect domain fronting within a network. While the system 100B shows an example controller 116, it is understood that any of the components of the system 100B and/or 100A described above may be implemented on any device in the network 102.

As illustrated, FIG. 1B comprises site(s) 110, network(s) 102, hosting provider(s) 108, controller 116, cloud service provider 114, network database(s) 118, administrator device(s) 120, and application 122, as described above with regard to FIG. 1A. As illustrated in FIG. 1B, a first hosting provider (hosting provider A 108A) may be located at a first location and a second hosting provider (hosting provider B 108B) may be located at a second location. As noted above, the site(s) 110 may be configured to send request(s) 126 to one or more of the hosting provider(s) 108. In some examples, the request(s) 126 may comprise DNS requests. The hosting provider(s) 108 may send data 128 in response to the request(s) 126, where the data 128 comprises DNS response and/or DNS result data. As illustrated in FIG. 1B, the controller 116 may be configured to generate and/or send an alert 130 to the administrator device 120. In some examples, the alert 130 is generated by the alert module described above and indicates a level associated with suspected malicious activity (e.g., such as domain fronting).

As noted above, malicious actors can use domain fronting to hide their network sessions from enterprise detection and response systems. Detecting sessions that use domain fronting is a hard problem. Attackers have many options when choosing a front domain, both in the domain and the hosting provider associated with the domain. For example, "ctldl.windowsupdate.com" is hosted by Akamai, StackPath, Limelight, and others. Some of these providers support domain fronting (e.g., such as StackPath), while others do not (e.g., such as Akamai).

Further, popular services are often hosted by multiple CDNs to increase resiliency and decrease latency. Accordingly, the techniques described herein recognizes that most CDNs do not support domain fronting, and thus a session that uses domain fronting with a common domain name will be forced to use a CDN that is atypical for their network location. For example, in most network locations, the appropriate CDN that hosts "ctldl.windowsupdate.com" is Akamai, which does not support domain fronting. Accordingly, a malicious actor that uses the StackPath CDN to hide a session destination behind a front of "ctldl.windowsupdate.com" will be conspicuous. In this example, the appropriate CDN for a hostname that appears in a TLS client_hello server name can be determined by querying the DNS system at the network location.

At "1", the system may collect data. For instance, the system may collect and/or store data using the collection module described above. In some examples, the system may collect and/or store collects all DNS responses associated with a particular site within the network. In some examples, the collection module may collect the IP addresses of the DNS servers used in the enterprise. For TLS and HTTP connections, the collection module may collect the destination IP addresses and estimates the RTT. The information is taken directly from the TLS/HTTP helps to lessen the impact of unsanctioned encrypted DNS and preserver network resources.

At "2", the system may generate a baseline. In some examples, the baseline is associated with the particular site within the network and based at least in part on the data. For instance, in the example "ctldl.windowsupdate.com" from above, the system collects all DNS responses with that domain name and builds a histogram of the IP addresses (and associated autonomous systems) and relevant DNS fields (e.g., canonical name and/or the authoritative DNS server). The collected RTT and TTL may also be included in the histogram and/or baseline. In some example, the baseline indicates CDN server(s) and/or hosting provider(s) utilized by most computing device(s) and/or application(s) at the particular site.

At "3", the system may receive network data. For instance, the system may passively collect and/or observe network traffic via the network data. The system may passively observe connection(s) to domain(s) and/or destination IP address(es) associated with the network data.

At "4", the system may identify connection(s) associated with suspicious activity. In some examples, the suspicious activity may correspond with domain fronting. For example, when a connection to a popular domain is seen going to a destination IP address with a low prevalence with respect to other connections from the same site, the system may send a series of DNS scans to DNS servers that the endpoint and similar endpoints have previously used. In this example, DNS-over-HTTPs intelligence feeds can also be included.

The system may then analyze the DNS response data to check whether the destination IP address would have been selected organically and/or if the endpoint application would have specifically selected the destination provider and/or hosting provider. The reasoning is that DNS servers and applications will choose an IP address that minimizes the RTT or some other criteria to more efficiently deliver content.

At "5", the system may generate alert(s). For instance, the system may generate alert(s) using the action module described above. In some examples, such as where the system determines an application selects a hosting provider that does not minimize RTT, but does support evasive behaviors (e.g., domain fronting), then the system may generate an alert that can be correlated with other endpoint and network events. In some examples, the IP addresses of popular domains that are inappropriate for a network location can be used to identify anomalous connections using a fast IP prefix lookup scheme. Moreover, as described above, TTL may be utilized to determine whether an anomalous DNS server is selected.

In some examples, DNS-over-HTTPs intelligence feeds can also be included in the DNS scans. For instance, if system determines that the endpoint is using an obscure DoH server, the system may ignore the DNS responses and/or the level of the resulting alert that is generated should be raised.

In this way, the system may more accurately identify and raise alerts of domain fronting within a network, thereby creating a more secure DNS system. Moreover, by utilizing RTT and TTLs, the system may identify domain fronting from the same site within a network, improving the security of the network and reducing network latency.

Figure 2:
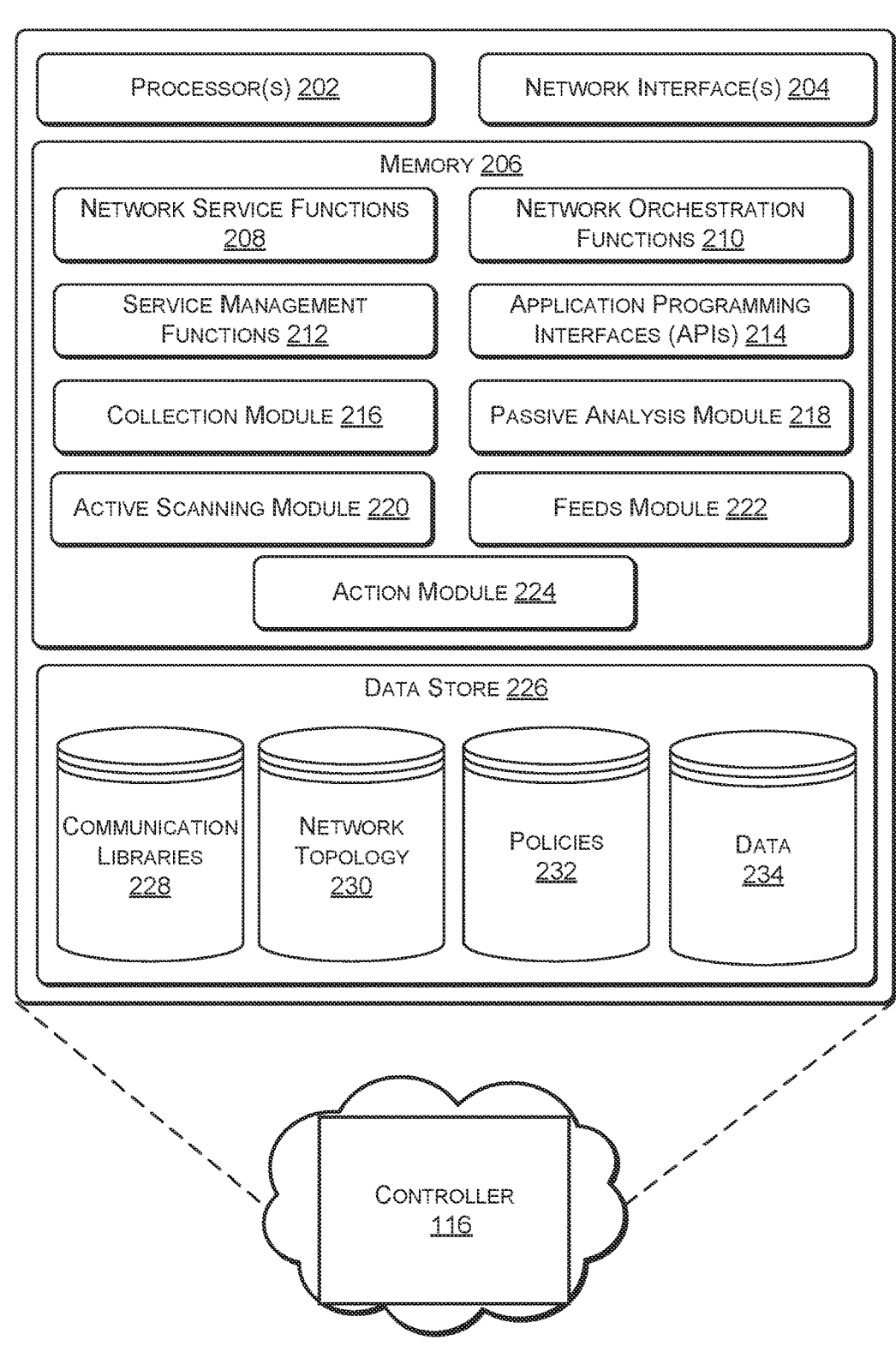
FIG. 2 illustrates a component diagram of an example controller described in FIGS. 1A and 1B.

FIG. 2 illustrates a component diagram of an example monitoring system described in FIG. 1. In some instances, the controller 116 may run on one or more computing devices in, or associated with, the network 102 (e.g., a single device or a system of devices). In some instances, the controller 116 may be integrated as part of a cloud-based management solution (e.g., such as Cisco's vSmart feature and/or Cisco's vManage feature) and/or a cloud service provider (e.g., such as AWS, etc.).

Generally, the controller 116 may include a programmable controller that manages some or all of the control plane activities of the network 102, and manages or monitors the network state using one or more centralized control models.

As illustrated, the controller 116 may include, or run on, one or more hardware processors 202 (processors), one or more devices, configured to execute one or more stored instructions. The processor(s) 202 may comprise one or more cores. Further, the controller 116 may include or be associated with (e.g., communicatively coupled to) one or more network interfaces 204 configured to provide communications with network device(s) 104, the edge device(s) 106 and other devices, and/or other systems or devices in the network 102 and/or remote from the network 102. The network interfaces 204 may include devices configured to couple to personal area networks (PANs), wired and wireless local area networks (LANs), wired and wireless wide area networks (WANs), SDWANs, SDCI's, and so forth. For example, the network interfaces 204 may include devices compatible with any networking protocol.

The controller 116 may also include memory 206, such as computer-readable media, that stores various executable components (e.g., software-based components, firmware-based components, etc.). The memory 206 may generally store components to implement functionality described herein as being performed by the controller 116. The memory 206 may store one or more network service functions 208, such as a slicing manager, a topology manager to manage a topology of the network 102, a host tracker to track what network components are hosting which programs or software, a switch manager to manage switches of the network 102, a process manager, and/or any other type of function performed by the controller 116.

The controller 116 may further include network orchestration functions 210 stored in memory 206 that perform various network functions, such as resource management, creating and managing network overlays, programmable APIs, provisioning or deploying applications, software, or code to hosts, and/or perform any other orchestration functions. Further, the memory 206 may store one or more service management functions 212 configured to manage the specific services of the network 102 (configurable), and one or more APIs 214 for communicating with devices in the network 102 and causing various control plane functions to occur.

Further, the controller 116 may include a collection module 216. In some examples, the collection module may collect data and/or network data associated with the network. In some examples, the data and/or network data may comprise a plurality of DNS CNAME records. In some examples, the DNS CNAME records may comprise one or more of a requested domain, a canonical name, an IP address, and/or any other data included in a DNS CNAME record. In some examples, the collection module may store the data and/or network data in local memory and/or a database associated with the system.

In some examples, the collection module may collect and/or store collects all DNS responses associated with a particular site within the network. In some examples, the collection module may collect the IP addresses of the DNS servers used in the enterprise. For TLS and HTTP connections, the collection module may collect the destination IP addresses and estimates the RTT. The information is taken directly from the TLS/HTTP helps to lessen the impact of unsanctioned encrypted DNS.

The controller 116 may include a passive analysis module 218. In some examples, the passive analysis module is configured to mine the data and/or network data collected and stored by the collection module. For instance, the passive analysis module may extract one or more of the requested domain, the canonical name, and the IP addresses from DNS CNAME records collected from large scale real-world observations. In some examples, the passive analysis module may map one or more pairs of domain name(s), IP address(es), and/or CDN hostname(es) to one or more canonical names. For instance, the dataset may map the alias domains to the canonical domains and may be further filtered by looking for canonical names (e.g., such as "e.sni.global.fastly.net", "ghs.googlehosted.com," etc.) that host a large and diverse set of domain names.

In this way, the system may generate a list of pairs of <domain name, IP address> that map to the same canonical name. That is, the system may intelligently identify a set of names (e.g., encrypted names) to try and/or use for active scanning and/or to determine if domain fronting is occurring.

In some examples, the passive analysis module may define other ways to group <domain name, IP address> pairs to seed the active scan(s) for domain fronting. For instance, the passive analysis module may identify all observed pairs that belong to the same autonomous system, all observed pairs that map to the same IP address, and/or all observed pairs that map to subnets published by cloud service providers.

In some examples, the passive analysis module may utilize a domain name associated with a particular site within the network and may build a histogram of the IP addresses (and associated autonomous systems) and relevant DNS fields (e.g., canonical name and/or the authoritative DNS server). In some examples, such as for TLS and HTTP connections, the passive analysis module may incorporate the destination IP addresses and estimates the RTT into the histogram(s). In some examples, the destination IP address(es) and/or RTTs may be extracted directly from the TLS certificate(es) and/or HTTP header(s) to help lessen the impact of unsanctioned encrypted DNS and preserve network resources.

The controller 116 may include an active scanning module 220. In some examples, the active scanning module may, for the pairs of <domain name, IP address> that map to the same canonical name (e.g., identified by the passive analysis module), initiate a series of targeted scans to determine whether the hosting provider supports domain fronting. For instance, the active scanning module may send one or more scans to the hosting provider. In some examples, there are two, primary scans that are baseline scans where the TLS client_hello and HTTP request contain the target domain and a fronting scan where the TLS client_hello contains the fronted domain and the HTTP request contains the target domain.

In some examples, the controller may include a feeds module 222. In some examples, the feeds module may generate a comprehensive list of domains that map to hosting providers that support domain fronting. For instance, the feeds module may collect and/or store the resulting TLS certificate and HTTP response data from the scan(s). In some examples, the feeds module may compare the result data (e.g., the TLS certificate and HTTP response data) from the scan(s) to determine if a hosting provider supports domain fronting. In some examples, the list(s) comprise threat intelligence feed(s), which may be used by the system to augment threat intelligence data to include additional information related to domain fronting such as indicating support for domain fronting, the canonical name used by the hosting provider, and a set of popular domains that could be used to front, etc.

Further, the list(s) may comprise set(s) of canonical names, IP subnets, and autonomous systems associated with domain fronting, which may be distributed to add additional context to alerts that may have initially seemed benign to a human analyst.

In some examples, the controller may include an action module 224. In some examples, the action module may receive the intelligence threat feed(s) generated by the feed(s) module. In this example, the action module may generate network events that are annotated if the destination IP address maps to infrastructure that supports domain fronting. Further, the actions module may generate a weak indicator if the network event could be used as a front for a domain on the block list. For instance, the alert may be intelligent such that an administrator and/or end user does not just receive list of domain names and/or canonical names. Instead, the alert may identify and alert the administrator and/or end user of a specific canonical name and/or domain name being used. In some examples, the action module may enable aggressive blocking. In some examples, a network administrator may configure the action module to enable aggressive blocking. In some examples, aggressive blocking may indicate domain names and/or percentage(s) associated with domains of a hosting provider that support domain fronting. In some examples, aggressive blocking may comprise identifying relatively low prevalence domain names and a prevalence of associated domain fronting. In some examples, a network administrator can configure firewall to block specific canonical name identified. In some examples, aggressive blocking can be based on a threshold, where an alert to network administrator can be based on the threshold being met or exceeded. In some examples, the action module may create a watchlist of domain names and/or IP addresses that can be used for alerting and/or blocking. For instance, the action module may utilize the watchlist and/or apply it to an existing watchlist to check for domain fronting. In some examples, the actions module may be configured to instruct a DNS service to optimize responses to not include infrastructure that supports domain fronting. For example, the instructions may indicate to map returning Akamai-based IP addresses for "ctldl.windowsupdate.com" as opposed to mapping IP addresses mapping to StackPath and/or Limelight.

In some examples, the actions module may be configured to determine connection to a popular domain is seen going to a destination IP address with a low prevalence with respect to other connections from the same site. In this example, the actions module may send a series of DNS scans to DNS servers that the endpoint and similar endpoints have previously used. In this example, the DNS response data may then be analyzed to check whether the destination IP address would have been selected organically or if the endpoint application would have specifically selected the destination provider and/or hosting provider. For instance, a destination IP address and/or CDN server (e.g., such as Azure, Stackpath, etc.) may be selected organically based on location of an endpoint application and/or a location of the CDN server, such that round trip time (RTT) is minimized and/or time to live (TTL) is greatest. In this example, if an application selects a hosting provider that does not minimize RTT, maximize TTLs, and/or does support evasive behaviors (e.g., such as domain fronting), then the action module may generate an alert that can be correlated with other endpoint and network events. In some examples, the IP addresses of popular domains that are inappropriate for a network location can be used to identify anomalous connections using a fast IP prefix lookup scheme. In some examples, the action module may block a connection to a CDN server. For instance, where one or more first connection(s) from one or more computing device(s) at a site in the network are going to a first CDN server (e.g., such as Azure) that does not support domain fronting and one or more second connection(s) from one or more second computing device(s) located at the same network site are going to a second CDN server (e.g., such as StackPath) that does support domain fronting, the action module may (i) generate an alert and/or (ii) block the connection(s) to StackPath in order to cause the second computing device(s) to reissue a DNS query.

The controller 116 may further include a data store 226, such as long-term storage, that stores communication libraries 228 for the different communication protocols that the controller 116 is configured to use or perform. Additionally, the data store 226 may include network topology data 230, such as a model representing the layout of the network components in the network 102 and/or data indicating available bandwidth, available CPU, delay between nodes, computing capacity, processor architecture, processor type(s), etc. The data store 226 may store policies 232 that includes security data associated with the network, security policies configured for the network, firewall policies, firewall configuration data, compliance policies configured for the network, policies associated with the control policy sequence(s), etc. The data store 226 may store data 234 that includes DNS CNAME data, IP address(es), network data, round trip time(s), time to live(s), DNS response(s), location data, and/or any other data described herein.

Figure 3:
FIG. 3 illustrates an example environment associated with sending scan(s) for the system described in FIGS. 1-2.
Figure 3:
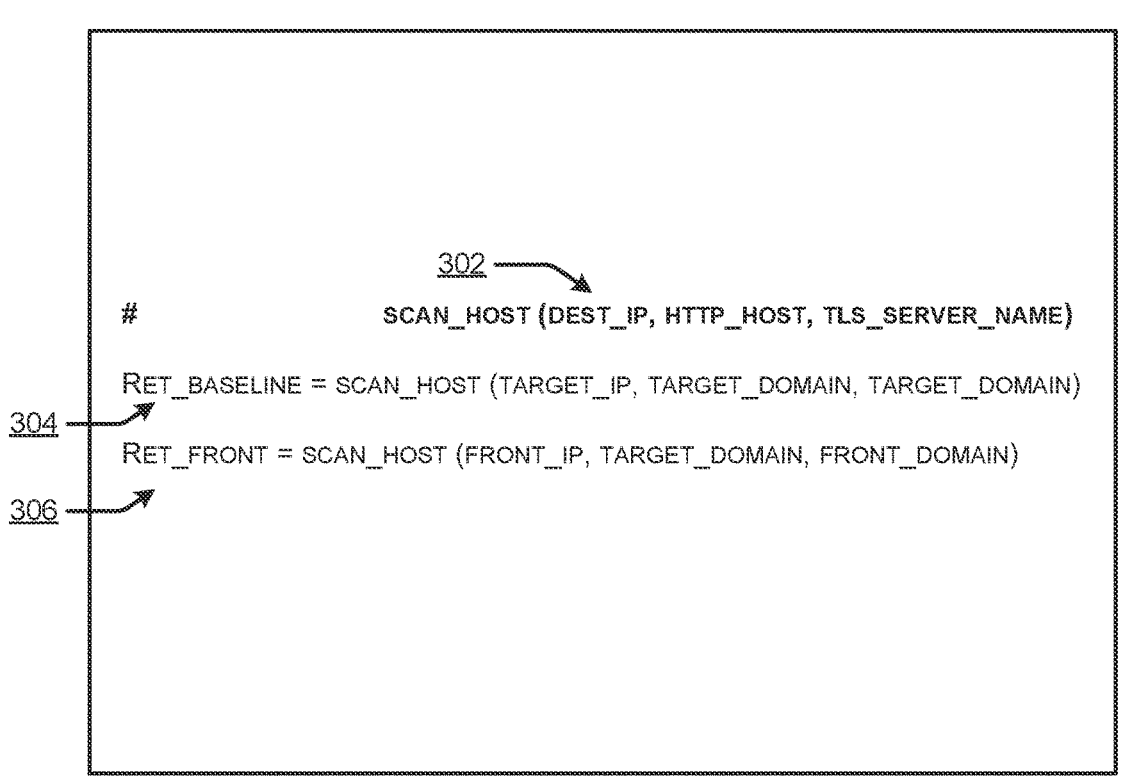

FIG. 3 illustrates an example environment 300 associated with sending scan(s) for the system(s) described in FIGS. 1-2. In some examples, the example environment 300 may correspond to examples of scan(s) sent to one or more hosting provider(s) 110. In some examples, the scan(s) may be sent by the active scanning module described above.

As illustrated, the example environment 300 comprises a user interface that indicates information 302 associated with the scan(s). For instance, the information 302 may comprise a number of the scan (illustrated as "#") and/or an indication of what to input for each scan (illustrated as "scan_host (dest_ip, http_host, tls_server_name)").

As illustrated and noted above, the system may send one or more targeted scan(s) to hosting provider(s) 108 to determine whether domain fronting is occurring. For instance, a first scan 304 may comprise information including a target IP address, a target domain associated with an HTTP host, and/or a target domain associated with a TLS server name. A second scan 306 may comprise second information including a target IP address that corresponds to a fronted IP address (e.g., an internal HTTPS IP address), a target domain associated with an HTTP host (e.g., TLS certificate and/or TLS handshake information), and/or a target domain associated with a fronted domain of the TLS server (e.g., an internal HTTP name and/or encrypted name). In this example, the information and the second information may be provided by the passive analysis module described above. As noted above, the system may compare the results of the two scans to determine whether domain fronting is occurring at a particular hosting provider. For instance, where the first scan 304 and the second scan 306 return different values, then the system may determine that domain fronting is not occurring. However, where the first scan 304 and the second scan 306 return the same value, the system may determine that domain fronting is occurring.

Accordingly, the system may utilize the scan(s) to identify, for pairs of domains using the same top-level CDN hostname, whether domain fronting is occurring.

Figure 4:
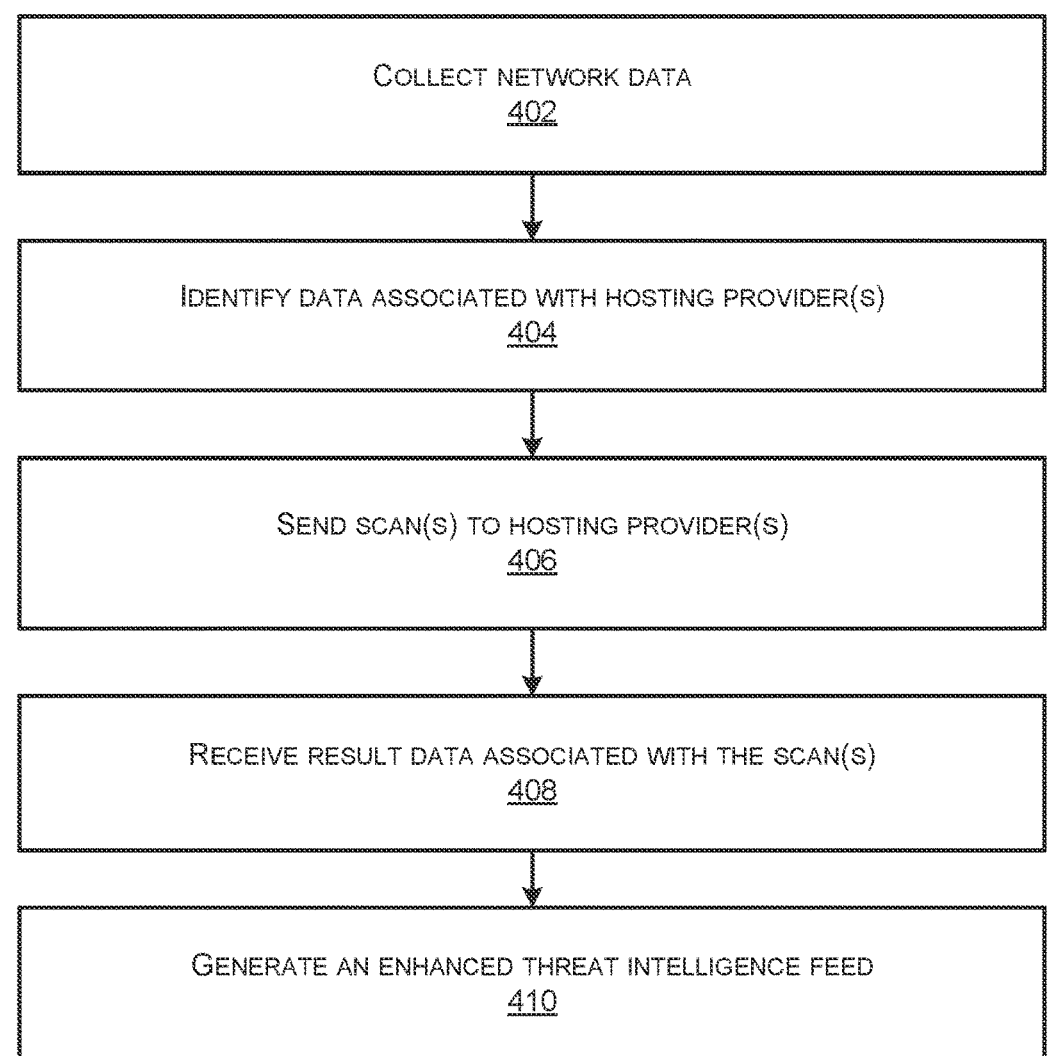
FIG. 4 illustrates a flow diagram of an example method for improving blocking and alerting within a network using domain fronting intelligence with the system described in FIGS. 1-3.

FIG. 4 illustrates a flow diagram of an example system 400 for improving blocking and alerting within a network using domain fronting intelligence with the system described in FIGS. 1-3. In some instances, the steps of system 400 may be performed by one or more devices (e.g., controller 116, network device(s) 104, edge device(s) 106, etc.) that include one or more processors and one or more non-transitory computer-readable media storing computer-executable instructions that, when executed by the one or more processors, cause the one or more processors to perform operations of system 400.

At 402, the system may collect network data. In some examples, the network data comprises domain names and IP addresses. In some examples, the system may collect the network data using the collection module described above.

At 404, the system may identify data associated with hosting provider(s). For instance, identifying the data associated with the one or more hosting providers comprises passively observe the network data. In some examples, the system may identify the data using the passive analysis module described above. In some examples, the data comprises one or more canonical names associated with one or more domain names or IP addresses.

At 406, the system may send scan(s) to hosting provider(s). In some examples, the scan(s) may comprise the one or more scans comprise: sending, to a hosting provider, a first request comprising one or more of a first canonical name, a first domain name, or a first IP address; receiving, from the hosting provider, first result data; sending to the hosting provider, a second request comprising one or more of a second canonical name, a second domain name, or a second IP address; receiving, from the hosting provider, second result data; and determining, based at least in part on the first result data and the second result data whether the hosting provider supports domain fronting.

At 408, the system may receive result data associated with the scan(s). In some examples, the result data indicates whether a hosting provider supports domain fronting.

At 410, the system may generate an enhanced threat intelligence feed. In some examples, the enhanced threat intelligence feed comprises a list of domains that support domain fronting. In some examples, the list further comprises one or more of: a canonical name associated with each domain; a process name or one or more hashes associated with each domain; one or more applications associated with each domain; or one or more IP subnets associated with each domain.

Figure 5:
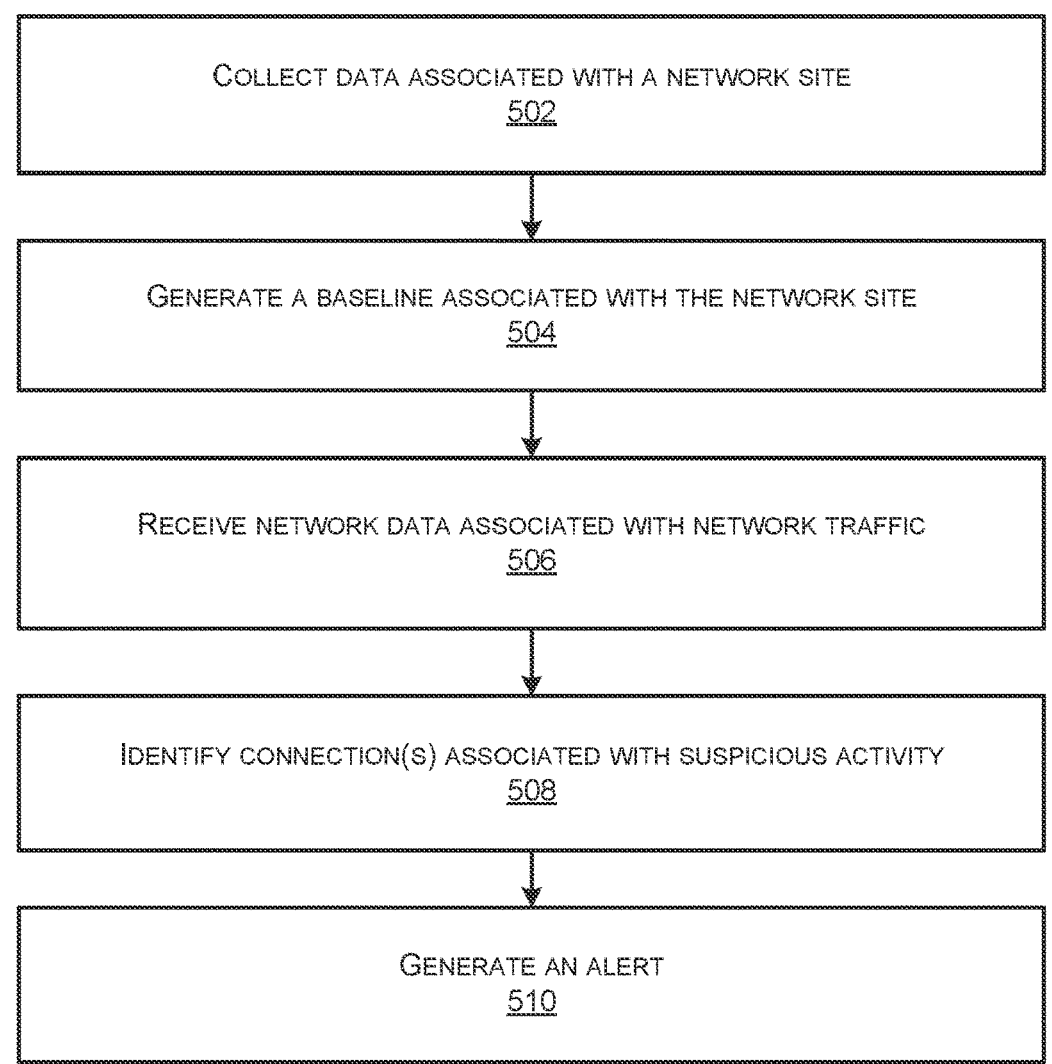
FIG. 5 illustrates a flow diagram of an example method for detecting and alerting on domain fronting using network location associated with the system described in FIGS. 1-4.

FIG. 5 illustrates a flow diagram of an example system 500 for detecting and alerting on domain fronting using network location associated with the system described in FIGS. 1-4. In some instances, the steps of system 500 may be performed by one or more devices (e.g., controller 116, network device(s) 104, edge device(s) 106, etc.) that include one or more processors and one or more non-transitory computer-readable media storing computer-executable instructions that, when executed by the one or more processors, cause the one or more processors to perform operations of system 500.

At 502, the system may collect data associated with a network site. In some examples, the data may comprise one or more DNS responses from one or more providers and one or more IP addresses, and DNS data associated with one or more DNS fields.

At 504, the system may generate a baseline associated with the network site. In some examples, the baseline comprises indications of an infrastructure for hosting services selected by endpoint devices associated with the site.

At 506, the system may receive network data associated with network traffic. In some examples, the network data may comprise one or more connections between the site and one or more hosting providers, the network data further comprises indications of an IP address, a domain name, a round trip time, or a time to live.

At 508, the system may identify connection(s) associated with suspicious activity. In some examples, the suspicious activity corresponds to domain fronting. In some examples, the system may identify the connection(s) using the passive analysis module, active scanning module, and/or the alert module described above.

At 510, the system may generate an alert. In some examples, the alert is generated by the alert module described above. In some examples, the alert is generated based at least in part on one or more of: (i) determining the one or more connections are to a hosting provider that is different from second connections to a second hosting provider associated with the site; (ii) determining the one or more connections are associated with a hosting provider that supports domain fronting; (iii) a round trip time associated with the one or more connections; or (iv) a time to live associated with the one or more connections.

In some examples, the system may determine that the one or more connections are associated with a hosting provider that supports domain fronting. In some examples, the system may block the one or more connections to the hosting provider.

Figure 6:
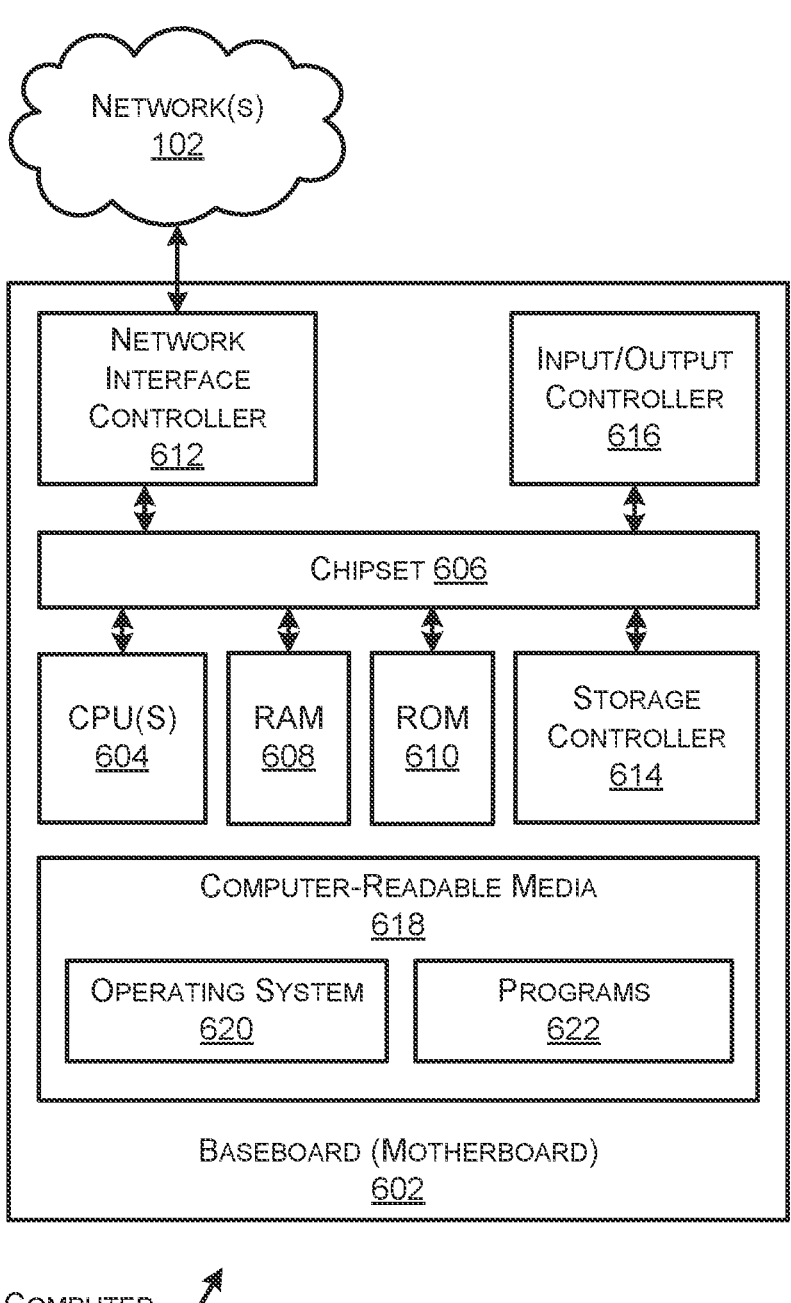
FIG. 6 is a computer architecture diagram showing an illustrative computer hardware architecture for implementing a device that can be utilized to implement aspects of the various technologies presented herein.

FIG. 6 shows an example computer architecture for a device capable of executing program components for implementing the functionality described above. The computer architecture shown in FIG. 6 illustrates any type of computer 600, such as a conventional server computer, workstation, desktop computer, laptop, tablet, network appliance, e-reader, smartphone, or other computing device, and can be utilized to execute any of the software components presented herein. The computer may, in some examples, correspond to a controller 116 and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as network 102. The chipset 606 can include functionality for providing network connectivity through a NIC 612, such as a gigabit Ethernet adapter. The NIC 612 is capable of connecting the computer 600 to other computing devices over the network 102. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the controller 116 and/or any components included therein, may be supported by one or more devices similar to computer 600. Stated otherwise, some or all of the operations performed by the controller 116 and/or any components included therein, may be performed by one or more computer devices 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a controller 116 and/or any other device. The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein as being performed by the controller 116 and/or any other device. The network interfaces may include devices configured to couple to personal area networks (PANs), wired and wireless local area networks (LANs), wired and wireless wide area networks (WANs), SDWANs, and so forth. For example, the network interfaces may include devices compatible with Ethernet, Wi-Fi™, and so forth.

The programs 622 may comprise any type of programs or processes to perform the techniques described in this disclosure. For instance, the programs 622 may cause the computer 600 to perform techniques including collecting, from a plurality of devices within the network, network data; identifying, based at least in part on the network data, data associated with one or more hosting providers; sending, to the one or more hosting providers, one or more scans; receiving, from the one or more hosting providers, result data associated with the one or more scans; and generating, based at least in part on the result data, an enhanced threat intelligence feed.

Further, the programs 622 may cause the computer 600 to perform techniques including collecting, from a plurality of devices within a network, data associated with a network site; generating, based at least in part on the data, a baseline associated with the network site; receiving, from the plurality of devices, network data associated with network traffic; identifying, based at least in part on the baseline and the network traffic, one or more connections associated with suspicious activity, and generating, based at least in part on the identifying, an alert.

In this way, the computer 600 can generate a list of pairs of <domain name, IP address> that map to the same canonical name. That is, the computer 600 may intelligently identify a set of names (e.g., encrypted names) to try and/or use for active scanning and/or to determine if domain fronting is occurring. Moreover, the computer 600 is able to utilize the enhanced intelligence threat feeds to perform more aggressive blocking, raising weak alerts that correlate with other system alerts. Further, by de-prioritizing infrastructure that supports domain fronting for DNS responses, the computer 600 may create a more secure DNS system.

Moreover, the computer 600 can more accurately identify and raise alerts of domain fronting within a network, thereby creating a more secure DNS system. Further, by utilizing RTT and TTLs, the computer 600 may identify domain fronting from the same site within a network, improving the security of the network and reducing network latency.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for detecting and alerting on domain fronting, the method comprising:

collecting, from one or more devices within a network, Domain Name System (DNS) response data associated with a domain name associated with plurality of network sites of a service provider of the network;

generating, based at least in part on the DNS response data, a baseline indicating Internet Protocol (IP) addresses for one or more servers or hosting providers utilized to host the domain name;

receiving network data associated with network traffic destined for the domain name;

identifying, based at least in part on the baseline and the network traffic, one or more connections having a destination IP address that is atypical relative to other connections to the one or more servers or hosting providers;

performing a DNS query to a DNS server previously used by an endpoint associated with the connection to obtain expected IP addresses for the domain name;

determining, based in part on the destination IP address for the connection not being included in the expected IP addresses, that the one or more connections are correlated with domain fronting; and generating, based at least in part on the determining, an alert.

2. The method of claim 1, wherein the DNS response data comprises one or more domain name system (DNS) responses from one or more providers and one or more IP addresses, and DNS response data associated with one or more DNS fields.

3. The method of claim 1, wherein the network data comprises a plurality of connections between the domain name and one or more hosting providers, the network data further including indications of an IP address, a domain name, a round trip time, or a time to live.

4. The method of claim 1, wherein the baseline comprises indications of an infrastructure for hosting services selected by endpoint devices associated with the domain name.

5. The method of claim 1, wherein generating the alert further comprises utilizing one or more intelligence feeds to determine a level of severity to include in the alert.

6. The method of claim 1, wherein the alert is generated based at least in part on one or more of:

(i) determining the one or more connections are to a first hosting provider that is different from second connections to a second hosting provider associated with the domain name;

(ii) determining the one or more connections are associated with a hosting provider that supports domain fronting;

(iii) a round trip time associated with the one or more connections; or (iv) a time to live associated with the one or more connections.

7. The method of claim 1, further comprising:

determining the one or more connections are associated with a particular hosting provider that supports domain fronting; and blocking the one or more connections to the hosting provider.

8. A system comprising:

one or more processors; and one or more non-transitory computer-readable media storing computer-executable instructions that, when executed by the one or more processors, cause the one or more processors to perform operations comprising:

collecting, from one or more devices within a network, Domain Name System (DNS) response data associated with a domain name associated with plurality of network sites of a service provider of the network;

generating, based at least in part on the DNS response data, a baseline including indications of Internet Protocol (IP) addresses for services or hosting providers utilized to host the domain name;

receiving network data associated with network traffic destined for the domain name;

identifying, based at least in part on the baseline and the network traffic, one or more connections having a destination IP address that is atypical relative to other connections to the services or hosting providers;

performing a DNS query to a DNS server previously used by an endpoint associated with the connection to obtain expected IP addresses for the domain name;

determining, based in part on the destination IP address for the connection not being included in the expected IP addresses, that the one or more connections are correlated with domain fronting; and generating, based at least in part on the determining, an alert.

9. The system of claim 8, wherein the DNS response data comprises one or more domain name system (DNS) responses from one or more providers and one or more IP addresses, and DNS data associated with one or more DNS fields.

10. The system of claim 8, wherein the network data comprises a plurality of connections between the domain name and one or more hosting providers, the network data further including indications of an IP address, a domain name, a round trip time, or a time to live.

11. The system of claim 8, wherein the baseline comprises indications of an infrastructure for hosting services selected by endpoint devices associated with the domain name.

12. The system of claim 8, wherein the destination IP address being atypical relative to the other connections indicates suspicious activity that corresponds to domain fronting, and wherein identifying the suspicious activity is based at least in part on:

determining that a connection of the one or more connections is between a device and a domain utilizes a hosting provider or a server that is atypical.

13. The system of claim 8, wherein the alert is generated based at least in part on one or more of:

(i) determining the one or more connections are to a hosting provider that is different from second connections to a second hosting provider associated with the domain name;

(ii) determining the one or more connections are associated with a hosting provider that supports domain fronting;

(iii) a round trip time associated with the one or more connections; or (iv) a time to live associated with the one or more connections.

14. The system of claim 8, the operations further comprising:

determining the one or more connections are associated with a hosting provider that supports domain fronting; and blocking the one or more connections to the hosting provider.

15. One or more non-transitory computer-readable media storing computer-readable instructions that, when executed by one or more processors, cause the one or more processors to perform operations comprising:

collecting, from one or more devices within a network, Domain Name System (DNS) response data associated with a domain name associated with plurality of network sites of a service provider of the network;

generating, based at least in part on the DNS response data, a baseline including indications of Internet Protocol (IP) addresses for services or hosting providers utilized to host the domain name;

receiving network data associated with network traffic destined for the domain name;

identifying, based at least in part on the baseline and the network traffic, one or more connections having a destination IP address that is atypical relative to other connections to the services or hosting providers;

performing a DNS query to a DNS server previously used by an endpoint associated with the connection to obtain expected IP addresses for the domain name;

determining, based in part on the destination IP address for the connection not being included in the expected IP addresses, that the one or more connections are correlated with domain fronting; and generating, based at least in part on the determining, an alert.

16. The one or more non-transitory computer-readable media of claim 15, wherein the data comprises one or more domain name system (DNS) responses from one or more providers and one or more IP addresses, and DNS data associated with one or more DNS fields.

17. The one or more non-transitory computer-readable media of claim 15, wherein the network data comprises a plurality of connections between the domain name and one or more hosting providers and indications of an IP address, a domain name, a round trip time, or a time to live.

18. The one or more non-transitory computer-readable media of claim 15, wherein generating the baseline comprises generating, using a plurality of domain name system responses received by the domain name, a histogram of a plurality of IP addresses, associated autonomous systems, and one or more DNS fields.

19. The one or more non-transitory computer-readable media of claim 15, wherein the baseline comprises indications of an infrastructure for hosting services selected by endpoint devices associated with the domain name.

20. The one or more non-transitory computer-readable media of claim 15, wherein the alert is generated based at least in part on one or more of:

determining the one or more connections are to a hosting provider that is different from second connections to a second hosting provider associated with the domain name;

(ii) determining the one or more connections are associated with a hosting provider that supports domain fronting;

(iii) a round trip time associated with the one or more connections; or (iv) a time to live associated with the one or more connections.

* * * * *